L. S. FLATAU.
VEHICLE WHEEL.
APPLICATION FILED SEPT. 20, 1913.
1,115,919.
Patented Nov. 3, 1914.
Fig. I.
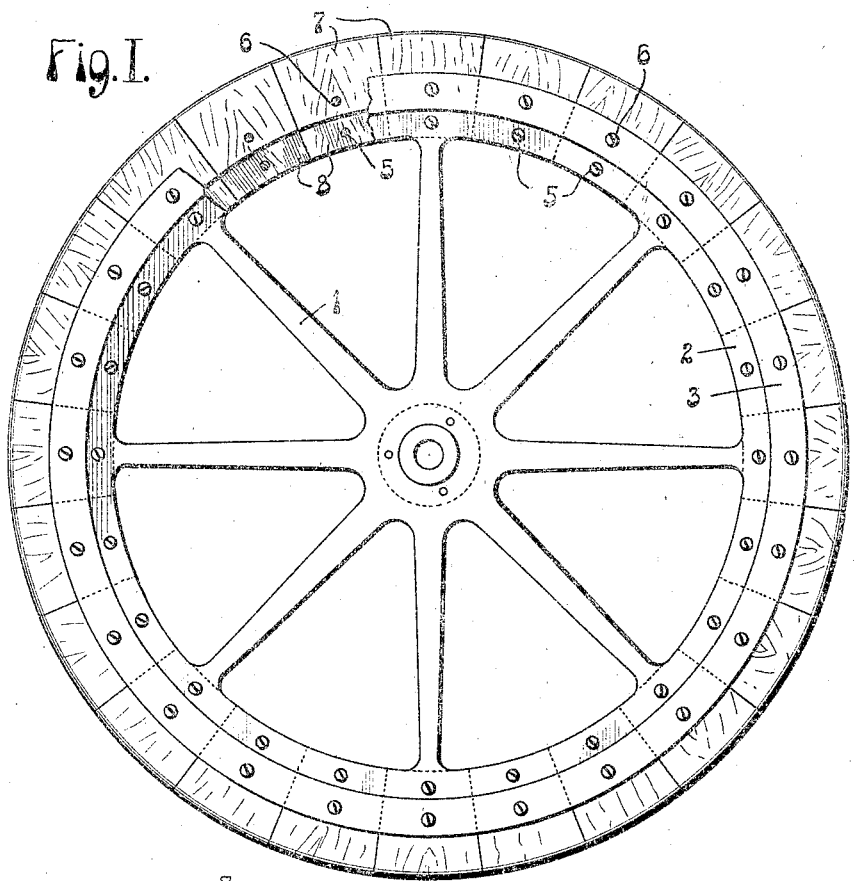
Fig. II.
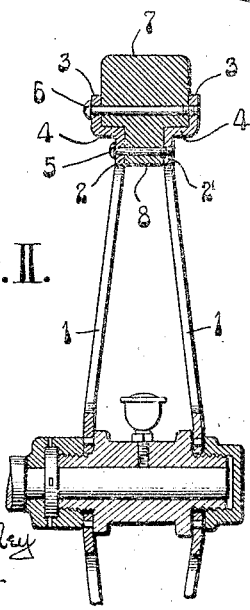
Fig. III.
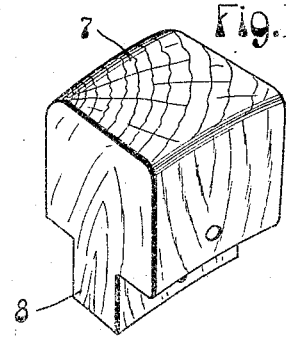
Attest
a. g. m<sup>c</sup>Cauley
E. B. Liu
Inventor:
L. S. Flatau
by Wright & Cook Att'ys.

UNITED STATES PATENT OFFICE.

LOUIS S. FLATAU, OF ST. LOUIS, MISSOURI.

VEHICLE-WHEEL.

1,115,919.

Specification of Letters Patent.

Patented Nov. 3, 1914.

Application filed September 20, 1913. Serial No. 790,891.

*To all whom it may concern:*

Be it known that I, LOUIS S. FLATAU, a citizen of the United States of America, and a resident of the city of St. Louis and State of Missouri, have invented certain new and useful Improvements in Vehicle-Wheels, of which the following is a full, clear, and exact description, reference being had to the accompanying drawings, forming a part of this specification.

My invention relates to a vehicle wheel suitable for use upon road vehicles of various kinds, but intended more particularly for use upon motor vehicles.

Among the objects of my present invention are the production of a vehicle wheel of low cost so constructed as to be of great strength and durability, and the tread of which is of such nature as to provide a high degree of tractional contact with a roadway surface, with a minimum tendency to skid or slip upon a slippery roadway.

Figure I is a side elevation of my vehicle wheel, with a portion of one of the frames of the wheel broken out. Fig. II is a cross section through the wheel. Fig. III is one of the tread and felly segments.

In the drawings: 1 designates the metal side frames or spiders of my wheel, each of which includes a peripheral rim, comprising an inner member 2 and outer wings 3, joined to said inner member 2 by intervening webs 4, which occupy positions approximately at right angles to the inner members and outer wings of the rim. The rim members made as described provide a pocket for a series of tread and felly segments of my wheel, to be presently described; and the parts 2 and 3 have respectively mounted therein screws or bolts 5 and 6, by which said felly and tread segments are attached to and held between the rim members of the frames 1.

The tread and felly segments used in my wheel are of wood and each segment comprises a tread forming head 7, and a felly neck 8, of less thickness than said head, the heads of the segments being of such width that they fit snugly between the wings 3 of the wheel frame rims, while the inner ends of the heads rest upon the ledges or shoulders furnished by the webs 4 joining the wings 3 to the inner members 2 of the wheel frame rims. The necks 8 of the wooden segments fit snugly between the inner members 2 of the wheel frame rims, and are clamped therebetween through the medium of the screws or bolts 5 to constitute the felly of the wheel.

It will be understood that inasmuch as each of the wooden segments is secured to the rim of my wheel by a fastening means extending through the inner members of the wheel frames and through the tongue of the segment, and also by a second fastening means extending through the outer wings and the tread forming head of the segment, the segments are firmly and securely held in position; but it will be as readily understood that any segment may be easily and quickly removed and replaced by a new section when it becomes worn or impaired so as to become unfit for further service.

The wooden tread and felly forming segments of my wheel are produced with the grain of the wood therein running lengthwise of the segments, or in a direction which is radial with the axis of the wheel when the segments are mounted therein; and the production of wooden segments with the grain running in this direction is an important feature of my present invention. By so making the wooden segments, the ends of the grain therein are presented to the roadway on which the wheel travels, and all impact against the wheel is directed longitudinally of the grain, without liability of the wood being slivered, flaked or split, as would be liable to occur if the grain in the wood of the sections extended transversely instead of longitudinally thereof.

A wheel made in accordance with my invention is extremely durable and inexpensive of manufacture, the segments may be easily and quickly replaced when repairs are necessary, and the construction of the wooden segments provides the necessary felly of the wheel. The tread of the wheel, being of wood, is not liable to slip upon a roadway as other materials from which the treads or tires of vehicle wheels are made: and, consequently, the tread of my wheel obtains a highly effective tractional purchase upon a roadway, and is not likely to skid on a wet roadway under ordinary conditions.

I claim:—

A wheel comprising metal side frames, each of which is provided with a rim member 3, a felly member 2, and a tire seat shoulder 4 between said rim and felly members; and wooden segments between said metal side frames, each of said wooden segments having a tread forming head 7 seated on the tire seat shoulders 4 and a felly neck 8 of less thickness than said tread forming head extending inwardly from said tire seat shoulder, said tread forming head 7 being confined directly between the metal rim members 3 and the felly neck 8 being confined directly between the metal felly members 2, the felly of the wheel being a composite structure formed by the metal felly members 2 and the wooden felly necks 8, and a row of screws passing through and secured to the composite felly structure.

LOUIS S. FLATAU.

In the presence of—
E. K. CLARK,
E. B. LINN.